United States Patent [19]

Bocox et al.

[11] Patent Number: 5,426,466
[45] Date of Patent: Jun. 20, 1995

[54] COMPOSITE VIDEO SIGNAL WITH AUDIO

[75] Inventors: Ronald R. Bocox; Lloyd L. Lautzenhiser, both of Nobel, Canada

[73] Assignee: Emhiser Research Limited, Parry Sound, Canada

[21] Appl. No.: 999,640

[22] Filed: Dec. 31, 1992

[51] Int. Cl.⁶ .................. H04N 7/04; H04N 7/083; H04N 7/084

[52] U.S. Cl. ................................ 348/484; 348/482

[58] Field of Search .............. 358/145, 142, 143, 144, 358/146, 145, 147, 85; H04N 7/93, 7/04, 7/87, 7/06, 7/84; 348/479, 480, 481, 482, 483, 484, 485, 486, 462, 738

[56] References Cited

U.S. PATENT DOCUMENTS

| | | | |
|---|---|---|---|
| 2,266,194 | 12/1941 | Guanella | 348/484 |
| 3,423,520 | 1/1969 | Kelly . | |
| 3,446,914 | 5/1969 | Hodge . | |
| 3,857,998 | 12/1974 | Justice et al. | 348/482 |
| 3,902,007 | 8/1975 | Justice | 358/145 |
| 4,156,253 | 5/1979 | Steudel . | |
| 4,191,969 | 3/1980 | Briand et al. | 358/145 |
| 4,233,627 | 11/1980 | Sugihara . | |
| 4,253,115 | 2/1981 | Kergosien et al. . | |
| 4,318,125 | 3/1982 | Shutterly | 358/145 |
| 4,333,108 | 6/1982 | Quan et al. . | |
| 4,361,852 | 11/1982 | Katzfey . | |
| 4,442,461 | 4/1984 | Shirai et al. . | |
| 4,745,476 | 5/1988 | Hirashima . | |
| 4,983,967 | 1/1991 | McKenzie . | |

FOREIGN PATENT DOCUMENTS 0723318 12/1965 Canada .................. 358/145

Primary Examiner—James J. Groody
Assistant Examiner—Michael H. Lee
Attorney, Agent, or Firm—Wendell E. Miller

[57] ABSTRACT

A method for inserting an audio signal (132) into a composite video signal (10) having a front porch (24), a back porch (26 or 32), a horizontal sync pulse (20) with a leading edge (22), and a luminance portion (16) to provide an audio-on-video signal (222), includes removing one or more video parts (180, 200) at least partially from the luminance portion (16), sampling one or more audio parts (182, 202), biasing a zero magnitude (238) of the audio parts (182, 202) to the midpoint (240) of the maximum luminance magnitude (242), and placing the sampled parts (182, 202) at least partially within the luminance portion (16) of the composite video signal (10) to form the audio-on-video signal (222). The method for inserting also includes inserting audio parts (212) into blanking parts (206) that follow leading and trailing equalizing pulses (46, 56); and the method for inserting further includes inserting audio parts (214) into blanking portions (60) of test signals (58) that follow the trailing equalizing pulses (56). A method for separating an audio signal (132) from the audio-on-video signal (222) includes sampling an audio plus magnitude (230) of the audio parts (182 and/or 202) at least partially within the luminance portion (16), subtracting a bias magnitude (234) to provide an audio sample magnitude (280 or 288), holding the audio sample magnitude (280 or 288), replacing the held audio sample magnitude (280 or 288) with a successive audio sample magnitude (280 or 288) to provide a stepped audio output (320), low pass filtering (310) to smooth the stepped audio output (320) and to prevent Nyquist problems, and high pass filtering (310) to prevent noise when an audio sample magnitude (318) is held during a vertical sync pulse (48).

45 Claims, 7 Drawing Sheets

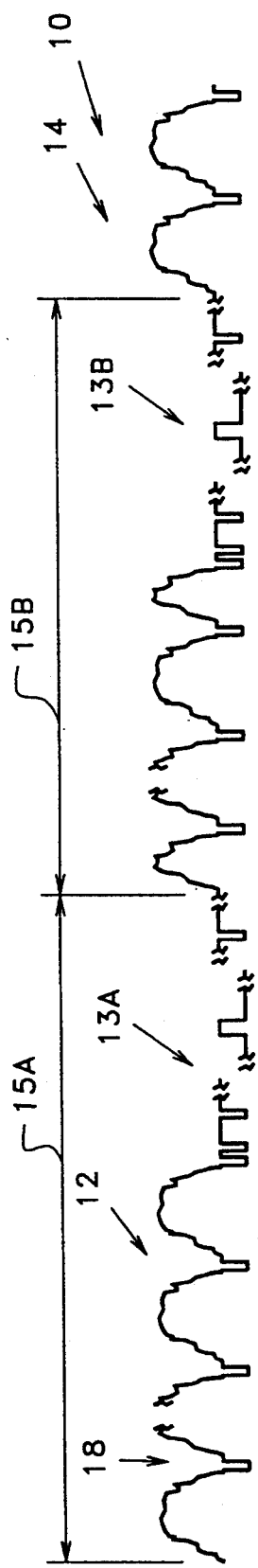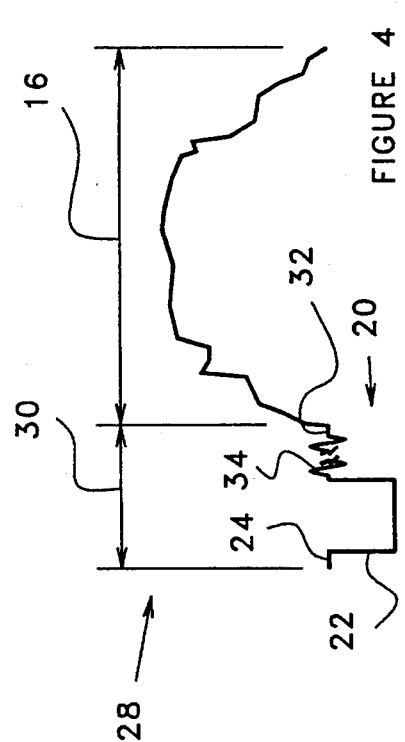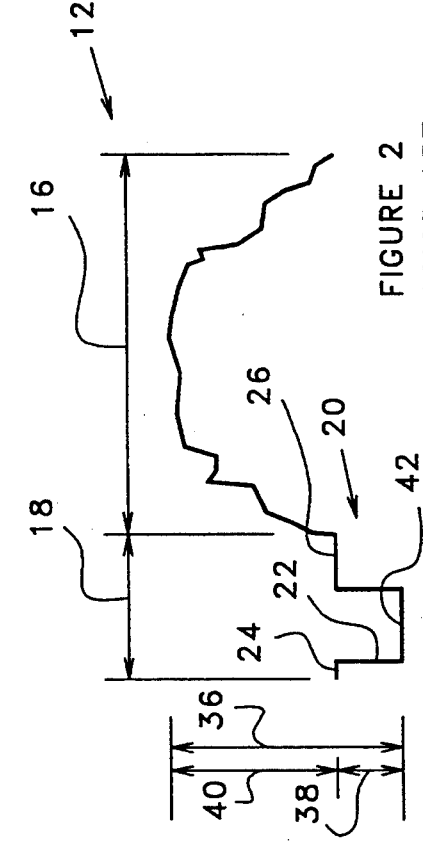

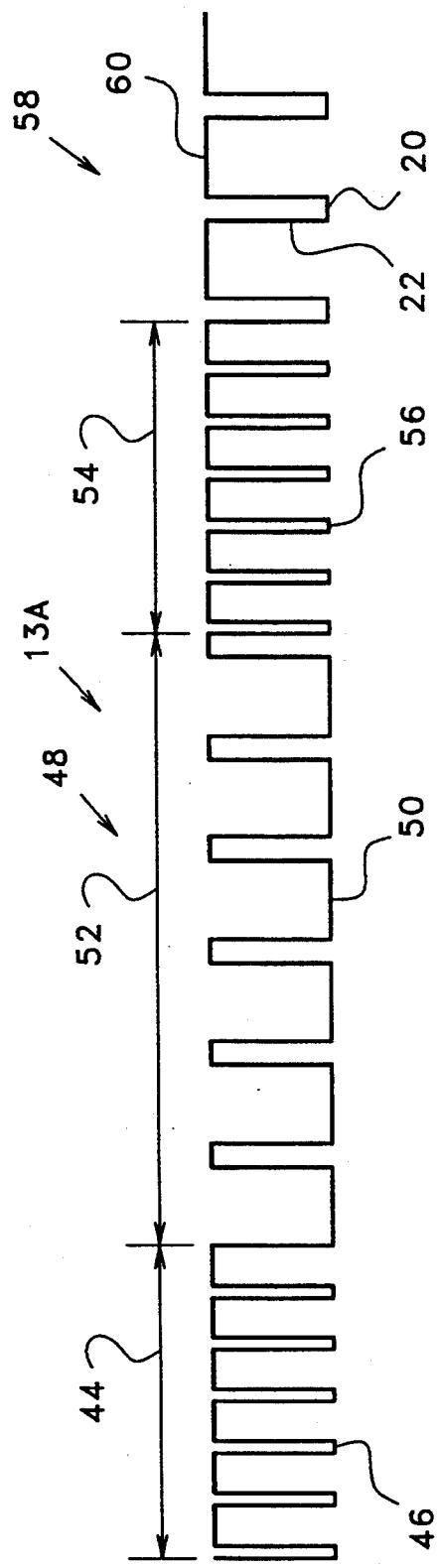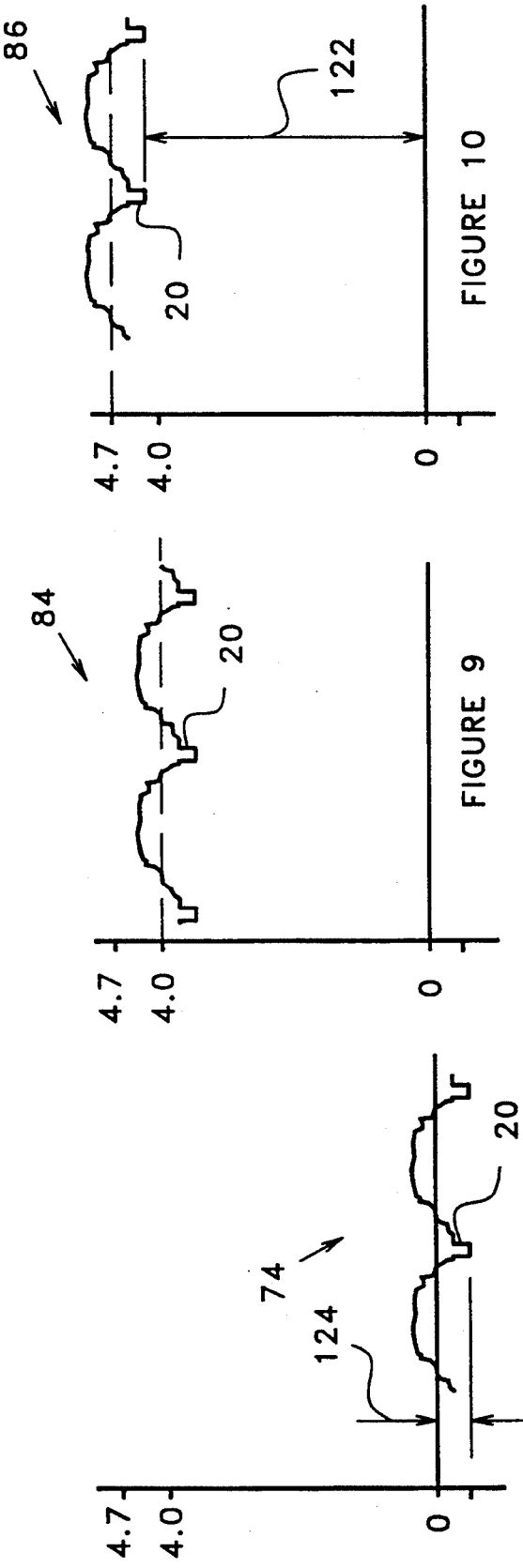

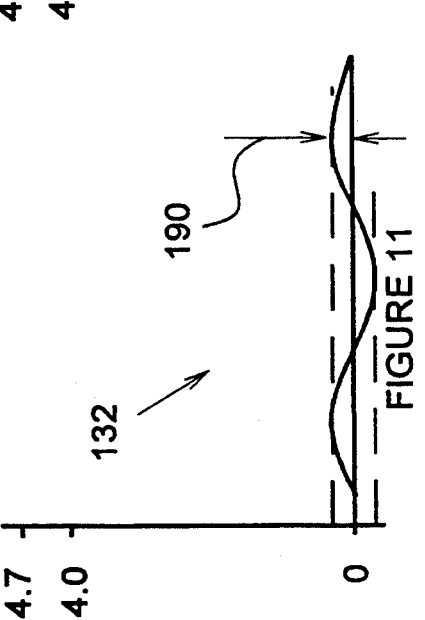
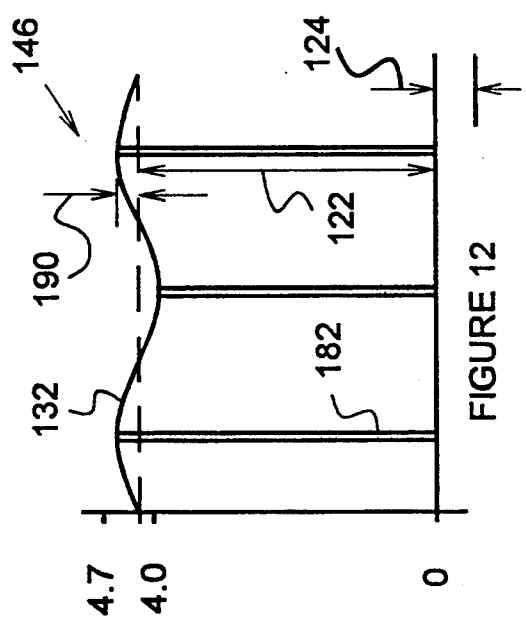
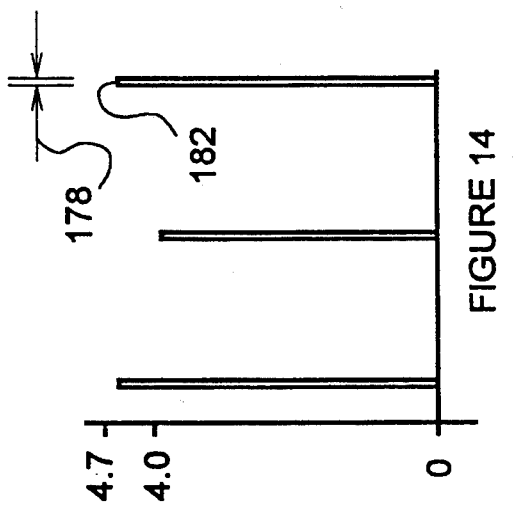
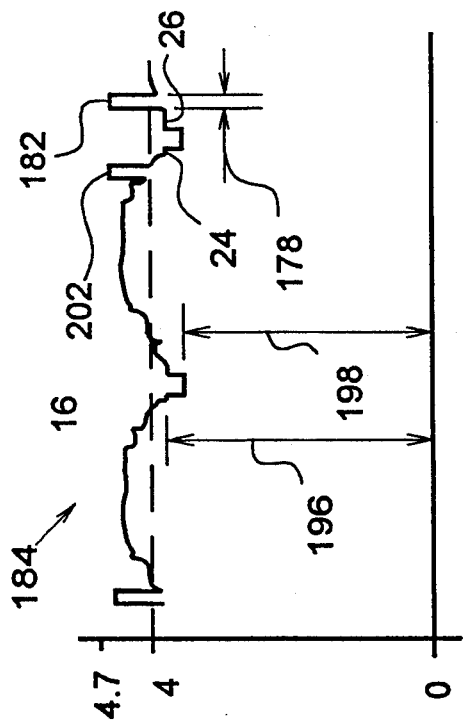
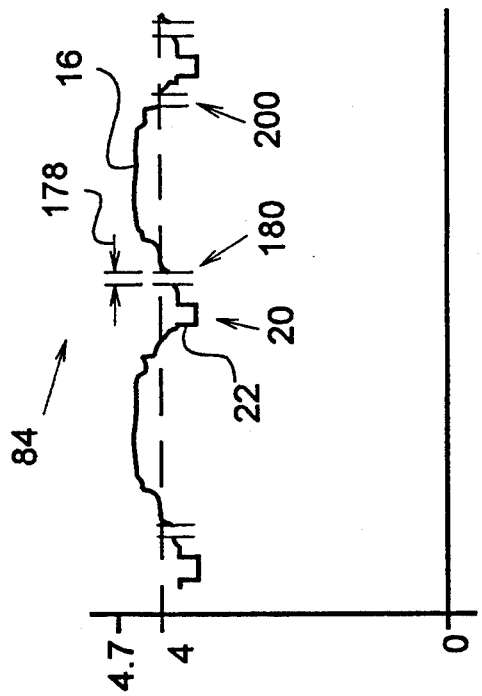

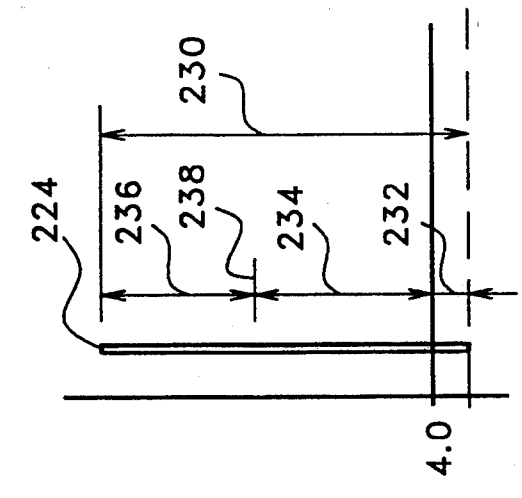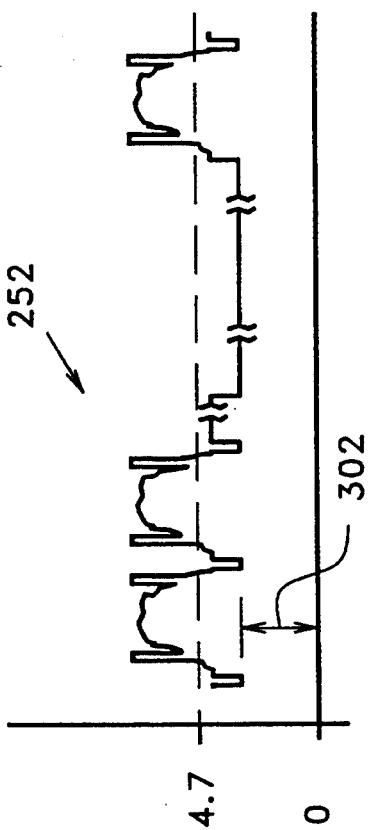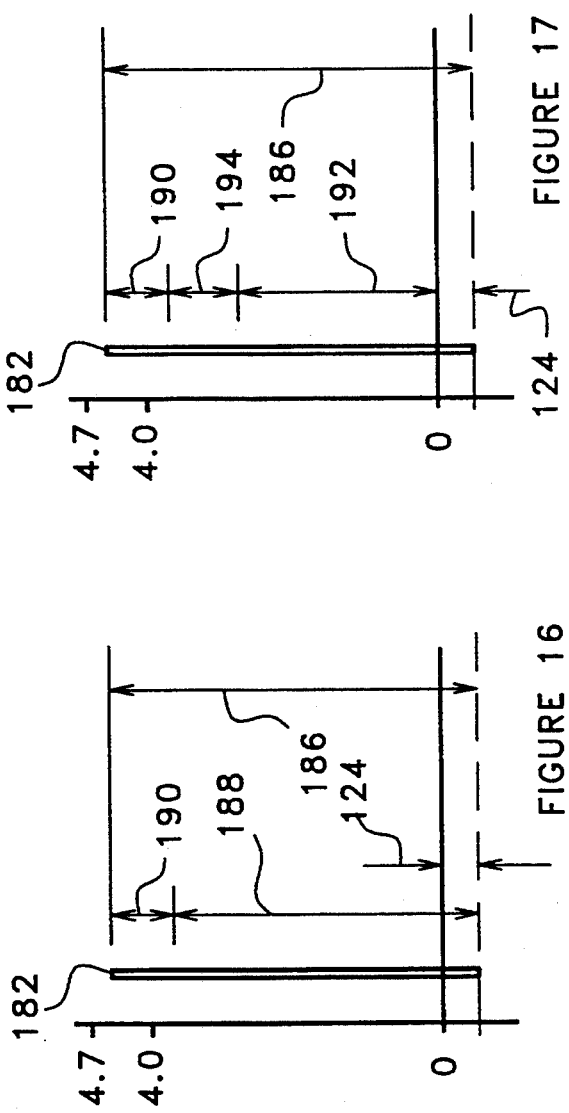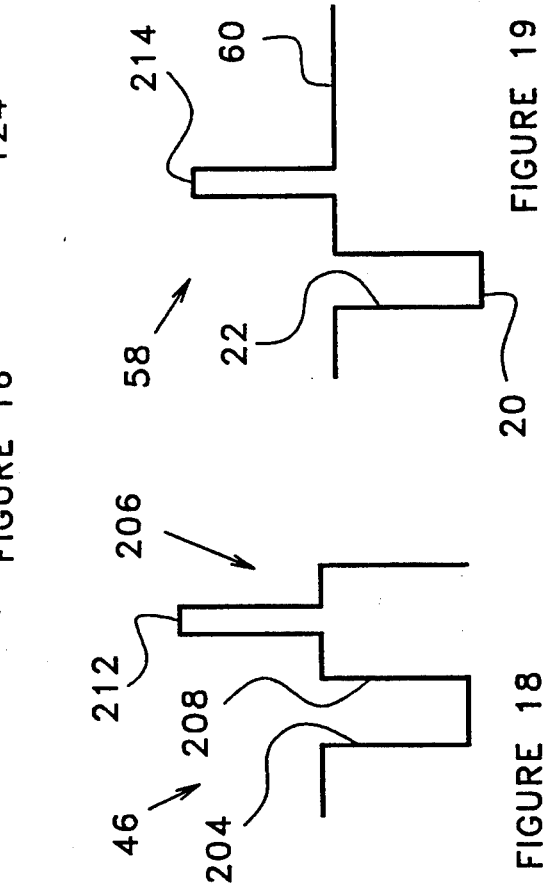

COMPOSITE VIDEO SIGNAL WITH AUDIO

BACKGROUND OF THE INVENTION

1. Field of the Invention

The present invention relates generally to transmitting and receiving video and audio signals. More particularly, the present invention relates to apparatus and method for combining audio signals into the luminance portion, and into other portions, of composite video signals to provide audio-on-video composite signals, and for separating the audio from the audio-on-video composite signals.

2. Description of the Related Art

Video is commonly transmitted by combining various synchronizing signals, or timing signals, with a luminance signal to make a composite video signal, either amplitude or frequency modulating the r.f. carrier, and broadcasting the r.f. carrier with audio on frequency modulated sidebands.

Each composite video signal includes first and second video fields of horizontal lines, with the first and second video fields interlaced. Each of the first and second video fields include a horizontal composite signal and a vertical blanking portion; and each horizontal composite signal includes a luminance portion and a horizontal blanking portion.

The horizontal blanking portion includes a front porch, a horizontal sync pulse with a leading edge, and a back porch. When color video is broadcast, a color burst is included in the back porch of each horizontal composite signal.

A plurality of horizontal composite signals is followed by a vertical blanking portion in which synchronizing and timing signals are placed to alternately produce first and second video fields of horizontal lines. The vertical blanking portions include leading equalizing pulses, a serrated vertical sync pulse, trailing equalizing pulses, and a plurality of test signals.

This prior art method of broadcasting video and audio has been very successful; but placing audio onto sidebands results in wide bandwidth requirements. For instance, if color video and audio are transmitted with the video on sidebands in a band that includes frequencies from 1850 to 1990 megahertz, and which is commonly called the 1900 megahertz band, and if both the video and audio are frequency modulated, the bandwidth requirement can exceed 25 megahertz. Or, of black and white video is transmitted with audio on sidebands, the bandwidth requirement is in the 15–18 megahertz range.

Further, while many bands have been available for entertainment video, there have been no bands available for business video. However, bands are now available that could be used for business video; but they are too narrow for conventional FM video transmission. Some of these bands are only 10 megahertz wide; and some are even narrower, being only 5 megahertz wide.

Thus, radio frequencies are available for use by businesses; and these bands could be used by a bank, or other business, for communicating by video with branches; but using prior art techniques results in a bandwidth requirement in excess of 25 megahertz for color and 15–18 megahertz for black and white video. In contrast to bandwidth requirements for video, the new bands are only 5 and 10 megahertz wide.

One solution to the requirement for a large bandwidth is to place the audio signal, or audio signals, onto the horizontal composite signal. Various schemes have been proposed to accomplish this.

Kelly, in U.S. Pat. No. 3,423,520, issued Jan. 21, 1969, places the audio signal in the horizontal blanking portion, and more particularly on the front porch. While Kelly teaches pulse amplitude modulation, he states that any form of pulse modulation may be used for the audio, including pulse duration modulation, pulse position modulation, or pulse code modulation.

Hodge, in U.S. Pat. No. 3,446,914, issued May 27, 1969, also teaches placing the audio signal in the horizontal blanking portion, but he teaches placing it on the back porch. More particularly, Hodge teaches a method for recording both audio and video by the use of a phase modulated pulse that is placed on the back porch.

Steudel, in U.S. Pat. No. 4,156,253, issued May 22, 1979, also teaches placing the sound signals onto the back porch. However, Steudel teaches placing the sound signals, in digital form, partially before the color burst and partially after the color burst.

Sugihara, in U.S. Pat. No. 4,233,627, issued Nov. 11, 1980, teaches the use of pulse code modulation to place audio signals into the vertical blanking portion. More particularly, Sugihara places the audio signals into the blanking parts that follow the equalizing pulses.

Kergosien et al., in U.S. Pat. No. 4,253,115, issued Feb. 24, 1981, teach placing audio signals in the vertical blanking portion in digital form. More particularly, Kergosien et al. teach transmission of an audio frequency analog signal during the line synchronization interval of a television signal, including coding and decoding of analog values that have ben changed to digital form.

Quan et al., in U.S. Pat. No. 4,333,108, issued Jun. 1, 1982, place the audio, in digital form, in the horizontal blanking portion. More particularly, the audio signal is pulse width modulated, thereby varying the time of at least one edge of a pulse as a function of the voltage level of the audio signal at a selected time.

Katsfey, in U.S. Pat. No. 4,361,852, issued Nov. 30, 1982, teaches placing the audio in the vertical blanking portion. The audio signal is time-compressed for injection into the vertical blanking portion. When decoded, the audio information is read into a memory device at high speed, and then read out of the memory device at low speed, thereby reconstructing a substantially continuous audio signal.

Shiral et al., in U.S. Pat. No. 4,442,461, issued Apr. 10, 1984, teach placing the audio signals on the back porch of the horizontal blanking portion in pulse-code-modulated form. In order to fit a sufficient number of digital bits onto the back porch, the back porch is extended by replacing the standard horizontal sync pulses with narrow pulses, so that the following back porch is correspondingly extended.

Hirashima, in U.S. Pat. No. 4,745,467, issued May 17, 1988, teaches placing digitized delta-encoded sound signal information in the horizontal sync part of the horizontal blanking portion, and placing a standard digital signal of the same sound signal in the vertical blanking portion.

McKenzie, in U.S. Pat. No. 4,983,967, issued Jan. 8, 1991, teaches time compressing the audio signal, and placing the time-compressed audio signal, in analog form, into the vertical blanking portion.

While all of these prior art patents achieve the objective of placing the audio onto the horizontal composite signal, none of them achieve the simplicity and the low cost that is achieved by the present invention.

SUMMARY OF THE INVENTION

In the present invention, video transmitter apparatus removes a video part of the luminance portion of a horizontal composite signal, and replaces this video part with an audio sample. The audio part is biased up to a midpoint of a luminance magnitude, so that both positive and negative magnitudes of the audio signal will stay between the horizontal blanking magnitude and the maximum luminance magnitude.

Preferably the audio sample, which is timed from the leading edge of the horizontal sync pulse, is placed into the luminance portion proximal to the back porch. Optionally, the audio sample is placed near the front porch. Or, if desired, two audio, or other nonvideo samples, may be placed into the luminance portion, one near each porch.

When color video is broadcast, the color burst consumes most of the time duration of the back porch, so that there is very little space to place time signals on the back porch. In contrast, in the present invention, audio samples of relatively long time duration, such as 3 microseconds, are placed into the luminance portion.

In addition, to placing at least one audio sample into the luminance portion, or at least partially within the luminance portion, the present invention places a plurality of audio samples in the vertical blanking portion. Preferably, one audio sample is placed into three different portions of the vertical blanking portion.

More particularly, in a preferred embodiment one audio sample is placed into the blanking parts that follow the leading equalizing pulses, into each of the blanking parts that follow the trailing equalizing pulses, and into each of the horizontal scan lines of the vertical blanking portion that are used to transmit test signals.

In the video receiver apparatus of the present invention, an audio sample that is narrower than the audio sample that was placed into the luminance portion, is removed, a sample and hold circuit provides a stepped output, and filtering smooths the stepped output into an audio output that is suitable for voice transmission.

That is, in the present invention, an audio sample is placed inside the luminance portion of the horizontal composite signal, thereby allowing a relatively long time period for the audio sample, such as 3 microseconds. Also, since the audio signal is placed near the back porch, there is a minimum distance from the leading edge of the horizontal sync pulse to the audio sample, thereby allowing simplicity and economy of design while, at the same time, providing accuracy in placement and retrieval of the audio samples.

Further, since the period of the blanking parts following the equalizing pulses is quite wide, audio samples placed into these blanking parts can have a relatively long time duration, such as 3 microseconds. In like manner, audio samples placed into the scan lines provided for test signals can have at least as long a time duration as audio samples placed into the luminance portion of the horizontal composite signals. Thus, for audio samples placed into these additional places, simplicity, economy of design, and accuracy are achieved in the present invention.

Because the audio samples can have a relatively long time duration, and the audio samples are close to the leading edge of a horizontal sync pulse, or close to the leading edge of an equalizing pulse, the present invention minimizes the accuracy that is required of circuit components, the complexity in circuitry that is required, and cost of the video transmitter.

In the receiver, a 1 microsecond audio sample is retrieved from the 3 microsecond audio sample that was placed into the luminance portion by the transmitter. Because of being able to retrieve an audio sample of relatively short time duration from an audio sample of relatively long time duration, and because of the proximity of the audio sample to a leading edge of a sync, the present invention minimizes the accuracy that is required of circuit components, the complexity in circuity that is required, and video receiver cost.

It should be understood that each audio signal is biased to have a magnitude that puts it into the luminance range, whether placed into the luminance portion, into the leading equalizing pulses, into the trailing equalizing pulses, or into the horizontal scan lines that are included in the vertical blanking portion. Therefore, audio information becomes a part of the picture, and because of this it may sometimes be necessary to adjust the magnification of the picture, or its placement on the video screen, so that the audio information is not seen.

The present invention also provides a breakthrough in simplicity and low cost in that there is no requirement for storing audio signals, no need for time compressing the audio signal, and no need for expanding the time domain of time compressed signals.

Instead, in the video transmitter apparatus of the present invention, only one audio sample is taken for each luminance portion, each equalizing pulse, and each test signal of the blanking portion. Then, low pass filtering is used to prevent ambiguity that could be caused by Nyquist phenomenon.

In the video receiver apparatus of the present invention, a sample and hold circuit of simple design provides a stepped audio output.

Also, circuitry complexity and cost have ben minimized by holding a previous audio sample during the time period of a vertical sync pulse. More particularly, the stepped output is held from the last blanking part that follows a leading equalizing pulse, during the time duration of the vertical sync pulse, and to the blanking part that follows the first trailing equalizing pulse.

Low pass filtering removes noise and smooths the stepped audio output; and high pass filtering eliminates noise that would be caused by holding one audio pitch for this time duration. The result of both high pass and low pass filtering of the stepped audio output is audio quality that is quite adequate for voice transmission.

Finally, by placing audio samples inside the luminance portion, by locating the audio samples close to the back porch, by placing additional audio samples onto the blanking parts that follow the leading and trailing equalizing pulses, by placing one audio sample into each text signal of the vertical blanking portion, by holding a previous audio sample across the vertical sync pulses, and by avoiding both time-compression and time-expansion techniques, apparatus and method have been provided that minimizes bandwidth, minimizes complexity, minimizes component cost, and optimizes performance vs. unit cost.

In a first aspect of the present invention, a method is provided for inserting an audio signal into a composite video signal having a front porch, a horizontal sync pulse, a back porch, and a luminance portion, which method comprises sampling a magnitude of the horizontal sync pulse; sampling a magnitude of the audio signal;

holding one of the sampled magnitudes; performing the sampling of the other of the magnitudes during the holding step; combining the sampled audio signal magnitude, the sampled horizontal sync magnitude, and a bias magnitude to provide an audio plus magnitude; performing a part of the combining step during the holding step; and replacing a first part of the composite video signal with the audio plus magnitude.

In a second aspect of the present invention, a method is provided for inserting an audio signal into a composite video signal having a front porch, a horizontal sync pulse, a back porch, and a luminance portion, which method comprises sampling a magnitude of the horizontal sync pulse, sampling a magnitude of the audio signal; performing the sampling of the horizontal sync magnitude prior to the sampling of the audio signal magnitude; summing the horizontal sync magnitude with a bias magnitude; holding the summed magnitude; performing the sampling of the audio signal magnitude during the holding step; combining the sampled audio signal magnitude, the sampled horizontal sync magnitude, and the bias magnitude to provide an audio plus magnitude; completing the combining step during the holding step; and replacing a part of the composite video signal with the audio plus magnitude.

In a third aspect of the present invention, a method is provided for separating an audio signal from a composite video signal having a horizontal sync pulse, a back porch, a luminance portion, a front porch, and a vertical sync pulse, which method comprises sampling the voltage of the horizontal sync pulse; holding the sampled horizontal sync voltage; sampling the voltage of a first part of the composite video signal into which a first audio plus voltage has been inserted; the sampling of the first part comprises sampling the first audio plus voltage during the holding step; reducing the sampled first part to a sampled audio voltage by subtracting the sum of the sampled horizontal sync voltage and a bias voltage; and the reducing step comprises summing the sampled horizontal sync voltage and the bias voltage, holding the summed voltage, and subtracting the summed voltage from the sampled first audio plus voltage during both of the holding steps.

In a fourth aspect of the present invention, a method is provided for separating an audio signal from a composite video signal having a horizontal sync pulse, a back porch, a luminance portion, a front porch, and a vertical sync pulse, which method comprises sampling the voltage of the horizontal sync pulse; sampling the voltage of a first part of the composite video signal into which a first audio plus voltage has been inserted; holding one of the sampled voltages; performing the other sampling step during the holding step; holding the other of the sampled voltages; reducing the first sampled part to a first sampled audio voltage by subtracting the sum of the sampled horizontal sync voltage and a bias voltage; and performing a part of the reducing step during both of the holding steps.

In a fifth aspect of the present invention, a method is provided for separating an audio signal from a composite video signal having a horizontal sync pulse, a back porch, a luminance portion, a front porch, and a vertical sync pulse, which method comprises sampling the voltage of the horizontal sync pulse; sampling the voltage of a first part of the composite video signal into which a first audio plus voltage has been inserted; reducing the sampled voltage of the first part to a first sampled audio voltage by subtracting the sum of the sampled horizontal sync voltage and a bias voltage; sampling a voltage of a part of a leading equalization pulse into which a second audio plus voltage has been inserted; sampling a voltage of a part of a trailing equalization pulse into which a third audio plus voltage has been inserted; sampling a voltage of a portion of a test signal into which a fourth audio plus voltage has been inserted; and reducing the second, third, and fourth audio plus voltages to second, third, and fourth sampled audio voltages.

In a sixth aspect of the present invention, a method is provided for separating an audio signal from a demodulated composite video signal having a horizontal sync pulse, a back porch, a luminance portion, a front porch, and a vertical blanking portion with a vertical sync pulse, which method comprises separately floating the demodulated composite video signal around higher and lower voltages; sampling the magnitude of a part of the composite video signal that lies partially within the luminance portion at one of the floating voltages; holding the sampled magnitude; replacing the held sampled magnitude with successively sampled magnitudes; biasing the sampled magnitudes; and the biasing step comprises sampling the composite video signal at the other of the floating voltages.

In a seventh aspect of the present invention, a method is provided for separating an audio signal from a demodulated composite video signal having a horizontal sync pulse, a back porch, a luminance portion, a front porch, and a vertical blanking portion with a vertical sync pulse, which method comprises separately floating the demodulated composite video signal around higher and lower magnitudes; sampling a horizontal sync pulse magnitude from the higher floated signal; sampling the magnitude of a first part of the composite video signal that lies partially within the luminance portion from the lower floated signal; holding the sampled magnitude of the first part; replacing the held sampled magnitude with successively sampled magnitudes; biasing the successively sampled magnitudes; and the biasing step comprises reducing one of the sampled magnitudes of the lower floated signal by the sampled magnitude of the higher floated signal.

In an eight aspect of the present invention, a method is provided for inserting an audio signal into a composite video signal having a front porch, a horizontal sync pulse, a back porch, and a luminance portion, which method comprises floating the composite video signal at a different voltage in each of two separate paths; sampling the composite video signal in one of the separately-floated paths; using the sample to bias the audio signal; and using the biased audio signal to replace a portion of the video signal in the other of the separately-floated paths.

BRIEF DESCRIPTION OF THE DRAWINGS

FIG. 1 shows a prior-art composite video signal with the horizontal composite signals and vertical blanking portions thereof;

FIG. 2 is a prior-art horizontal composite signal of FIG. 1, as used for transmitting black and white video, and includes both the luminance portion and the horizontal blanking portion of the horizontal composite signal;

FIG. 3 is the horizontal blanking portion of the prior-art horizontal composite signal of FIG. 2, with the front porch, horizontal sync pulse, and back porch thereof, as used to transmit black and white video;

FIG. 4 is a prior-art horizontal composite signal as used for transmitting color video, and is different from the FIG. 2 horizontal composite signal in that a color burst is included;

FIG. 5 is the horizontal blanking portion of the prior-art horizontal composite signal of FIG. 4 with a color burst on the back porch;

FIG. 6 is part of the vertical blanking portion of the composite video signal of FIG. 1;

FIG. 8 shows horizontal composite signals floating around zero volts as they enter the apparatus of the present invention;

FIG. 9 shows the horizontal composite signals of FIG. 8 after being biased by 4.0 volts for carrying the video signal through the apparatus of the present invention;

FIG. 10 shows the horizontal composite signals of FIG. 8 after being biased by 4.7 volts to provide an audio bias of 4.7 volts for audio samples;

FIG. 11 is an audio signal that varies both positively and negatively as it enters the video transmitter apparatus of the present invention;

FIG. 12 is the audio signal of FIG. 11 after being biased 0.7 volts above the horizontal sync magnitude of FIG. 9;

FIG. 13 is the horizontal composite signal of FIG. 9 but with video parts removed from the luminance portion thereof;

FIG. 14 shows audio parts that have been taken from the biased audio signal of FIG. 12;

FIG. 15 is the resultant audio-on-video composite signal after removing video parts from the luminance portion of FIG. 13 and inserting audio, or nonvideo, parts of FIG. 14 therein;

FIG. 16 shows the components of an audio plus magnitude that makes up the audio samples of FIG. 14;

FIG. 17 shows the components of the audio plus magnitude of the audio samples of FIG. 14 with two bias voltages thereof separated;

FIG. 18 is a partial and enlarged curve showing an audio part inserted into the blanking part following one of the equalizing pulses of FIG. 6;

FIG. 19 is a partial and enlarged curve showing an audio part inserted into the blanking portion of one of the test signals that follows the trailing equalizing pulses of FIG. 6;

FIG. 22 illustrates the relationships between the audio plus magnitude and the audio magnitude; and FIG. 23 is a curve showing the 4.7-biased audio-on-video signal with the horizontal sync magnitude thereof.

DESCRIPTION OF THE PREFERRED EMBODIMENTS

Figure 7:
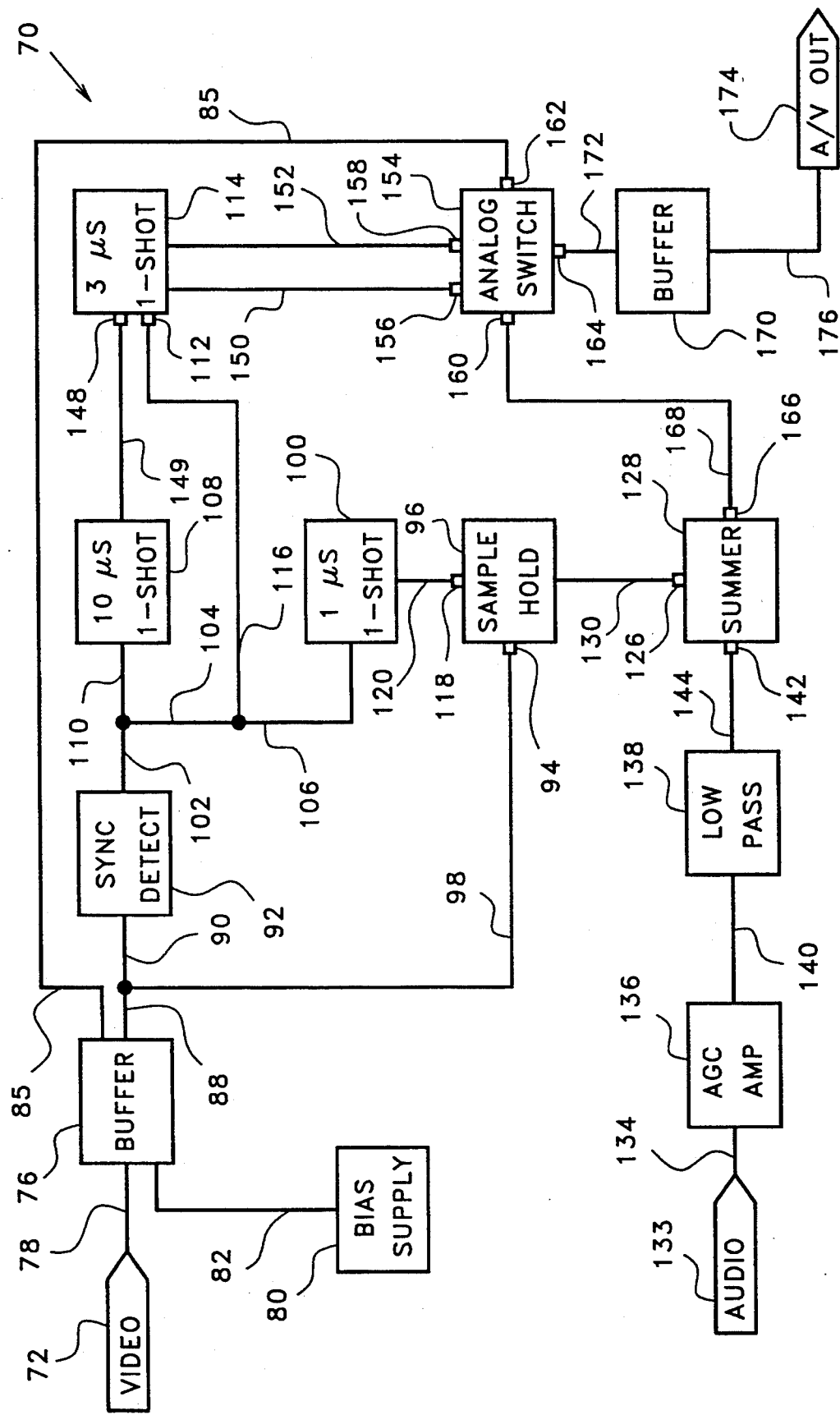
FIG. 7 is a block diagram of a video transmitter apparatus of the present invention which is used to insert audio samples into a part of the luminance portion, and into other parts of the composite video signal.

Referring to FIGS. 1 and 2, a black and white composite video signal 10 includes a plurality of black and white horizontal composite signals 12, a first-field vertical blanking time, or vertical blanking portion, 13A, another plurality of the black and white horizontal composite signals 12, and a second-field vertical blanking time, or vertical blanking portion 13B.

Each black and white horizontal composite signal 12 includes information required to display a single horizontal scan line of black and white video (not shown), and also includes video information and information needed for timing and synchronizing the video information of each single horizontal scan line of video.

One frame 14 of horizontal composite signals 12 includes a first video field 15A and a second video field 15B; and each video field, 15A or 15B, includes 241½ to 249½ black and white horizontal composite signals 12, and one vertical blanking time, 13A or 13B. The scan lines produced by a first video field 15A and a second video field 15B are interlaced to form one frame 14 of video.

Typically, the horizontal scan rate is 15,750 Hertz, so each of the horizontal composite signals 12 has a period of 1.0 H, or 63,492 microseconds. Each horizontal composite signal 12 includes a luminance portion 16 having a time duration of 0.84 H or 53.5 microseconds, which contains the video picture information, and a horizontal blanking portion 18 having a time duration of 0.16 H or 10.16 microseconds.

Referring now to FIGS. 1-3, and more particularly to FIG. 3, each of the horizontal blanking portions 18 includes a horizontal sync pulse 20 with a leading edge 22, a front porch 24, and a back porch 26. The front porch 24 has a time duration of 0.02 H, or 1.27 microseconds, the horizontal sync pulse 20 has a time duration of 0.08 H, or 5.07 microseconds, and the back porch 26 has a time duration of 0.06 H, or 3.81 microseconds.

Referring now to FIGS. 4 and 5, a color horizontal composite signal 28 includes the luminance portion 16, as described in conjunction with FIGS. 1 and 2, and a horizontal blanking portion 30. The luminance portion 16 is identical to the luminance portion 16 of FIGS. 1-3, and the horizontal blanking portion 30 includes parts as named and numbered, and having time durations, and as described in conjunction with the horizontal blanking portion 18 of FIG. 3, except that the horizontal blanking portion 30 of FIGS. 4 and 5 includes a back porch 32.

The back porch 32 of FIG. 5 differs from the back porch 26 of FIG. 3 only by a color burst 34 being inserted therein. The color burst 34 is 8 to 10 cycles at 3.58 megahertz, thereby taking from 2.24 to 2.79 microseconds of the 3.81 microsecond time duration of the back porch 32.

Referring now to FIG. 2, the horizontal composite signal 12 includes a composite magnitude 36 that is the sum of a horizontal blanking magnitude 38 and a luminance magnitude 40. The horizontal blanking magnitude 38 is maintained at a constant peak-to-peak voltage, but the luminance magnitude 40 varies in peak-to-peak voltage depending on the picture information.

The maximum signal level for the composite magnitude 36 is 1.00 volt peak-to-peak, which includes 0.25 volts for the horizontal blanking magnitude 38, leaving a maximum of 0.75 volts peak-to-peak for the luminance magnitude 40. The luminance magnitude 40 is always positive with respect to the horizontal blanking magnitude 38, the horizontal sync pulse 20 is negative with respect to the horizontal blanking magnitude 38 and extends negatively to a horizontal sync magnitude, or blacker-than-black magnitude, 42.

Although not shown herein, but as is well known to those skilled in the art, whether the composite video signal 10 is amplitude or frequency modulated, it is standard practice to place audio on sidebands separate from the composite video signal 10.

Also, as is well known to those skilled in the art, the horizontal composite signals, 12 or 28, transmit the video signal within the luminance portion 16, and control horizontal synchronizing functions by the leading edges 22 of successive ones of the horizontal sync pulses 20 in the horizontal blanking portions, 18 or 30.

Referring now to FIGS. 1 and 6, the vertical blanking portions, 13A and 13B, are each divided up into a leading equalizing period 44 having six leading equalizing pulses 46, a vertical sync pulse 48 with serrations 50 in a vertical sync period 52, a trailing equalizing portion 54 having six trailing equalizing pulses 56, and 10 to 21 test signals, 58.

Each of the test signals 58 results in one horizontal scan line, so there are 10 to 21 scan lines that do not include a luminance portion 16. However, each of the test signals 58 includes a horizontal sync pulse 20 and a blanking portion 60. The blanking portions 60 of the test signals 58 are used by broadcasters to transmit useful test information.

The leading equalizing period 44, the vertical sync period 52, and the trailing equalizing portion 54 each has a time duration of 3.0 H, or 190.48 microseconds. The equalizing pulses, 46 and 56, each has a time duration of 0.04 H, or 2.543 microseconds; the serrations 50 of the vertical sync pulse 48 have a time duration of 0.43 H, or 27.30 microseconds; and each of the test signals 58 has the same time duration as the horizontal composite signals 12. That is, each of the test signals 58 has a time duration of 1.0 H, or 63.492 microseconds.

The purpose of the equalizing pulses 46 and 56 is to provide a smooth transition between first and second video fields, 15A and 15B, that is, to provide a smooth transition in interlacing scan lines of the first and second video fields, 15A and 15B.

All of these functions are the same whether black and white or color video is transmitted. However when color is transmitted, the color burst 34 is included in the back porch 32 of the horizontal blanking portion 30.

Additional basic principles of transmitting and receiving video can be found in *Electronic Communications Systems* by Wayne Tomasi, published by Prentice Hall in Englewood Cliffs, N.J. in 1988, pages 452–483, and incorporated herein by reference, although additional information is not essential to understanding the present invention.

It should be understood that the invention disclosed herein works equally well with either black and white or color video. That is, the present invention works equally well whether or not the horizontal composite signals, 12 or 28, include the color burst 34 on the back porch, 26 or 32.

Referring now to the block diagram of FIG. 7, in the present invention video transmitter apparatus 70 is used to multiplex one or more audio signals, or other non-video information, into the luminance portion 16 of the horizontal composite signal, 12 or 28, or at least partially into the luminance portion 16.

The video transmitter apparatus 70 is interposed into a standard video transmitter (not shown), subsequent to placing picture information into the luminance portion 16 of the horizontal composite signal 12, and prior to modulating the horizontal composite signal 12.

In the video transmitter apparatus 70, the composite video signal 10 of FIG. 1 enters the video transmitter apparatus 70 at a video input arrow 72. As has been described previously, the composite video signal 10 includes a plurality of horizontal composite signals, 12 or 28.

The following discussion focuses on placing audio signals into the luminance portion 16 of the horizontal composite signals, 12 and 28, as opposed to placing audio signals into other parts of the composite video signal 10. Later, it will be shown that the video transmitter apparatus 70 also places audio signals, or other audio information, into other parts of the composite video signal 10.

Since operation is the same whether black and white or color video is transmitted, reference will be made only to the black and white horizontal composite signals 12.

Horizontal composite signals 12 of the composite video signal 10, as shown in FIGS. 1 and 2, are supplied to the video input arrow 72. However, the horizontal composite signals 12, as supplied to the video input arrow 72, are floating, as shown by a floating video signal 74 of FIG. 8. The floating video signals 74 are delivered from the video input arrow 72 to a buffer 76 via a conductor 78; and a video bias supply 80 delivers a video bias voltage to the buffer 76 via a conductor 82.

The buffer 76 cooperates with the video bias supply 80 to supply a 4.0-biased video signal 84, as shown in FIG. 9, to a conductor 85, which is the same as the floating video signal 74 of FIG. 8 except biased 4.0 volts. Also, the buffer 76 cooperates with the video bias supply 80 to supply a 4.7-biased video signal 86, as shown in FIG. 10, to a conductor 88, which is the same as the floating video signal 74 of FIG. 8 except biased 4.7 volts. Therefore, the composite video signal 10 is floated in two separate flow paths at two different voltages. The composite video signal 10 is floated at 4.0 volts in a flow path that is provided by the conductor 85, and the composite video signal 10 is floated at 4.7 volts in a flow path that is provided by the conductor 98.

The purpose for biasing the floating video signal 74 by 4.0 volts is to provide inputs for amplifiers that are roughly one half of the 8.0 volt magnitude of a regulated power supply (not shown, not an inventive part of the present invention) that is supplied to the amplifiers. The purpose for biasing the floating video signal 74 by 4.7 volts will be shown subsequently.

The 4.7-biased video signal 86 is delivered by the conductor 88 and a conductor 90 to a sync detector 92, and is delivered to a 4.7-biased video input 94 of a sample and hold circuit 96 by the conductor 88 and a conductor 98.

The sync detector 92 detects the leading edge 22 of the horizontal sync pulse 20, as more clearly seen in FIGS. 3 and 5. The sync detector 92 delivers a trigger pulse to a 1 microsecond one-shot 100, via conductors 102, 104, and 106, that coincides with the timing of the leading edge 22 of the horizontal sync pulse 20.

The sync detector 92 delivers the same trigger pulse to a 10 microsecond one-shot 108 via the conductor 102 and a conductor 110; and the sync detector 92 delivers the same trigger pulse to an auxiliary input 112 of a 3 microsecond one-shot 114 via the conductors 102 and 104, and a conductor 116.

The 1 microsecond one-shot 100, as it receives the trigger pulse from the sync detector 92, provides a 1 microsecond sample pulse to a trigger input 118 of the sample and hold circuit 96 via a conductor 120. The sample and hold circuit 96 then samples a 4.7-biased horizontal sync magnitude 122 of the horizontal sync pulse 20 of FIG. 10 which, being derived from the 4.7-biased video signal 86 of FIG. 10, and being supplied to the 4.7-biased video input 94, is 4.7 volts greater than a floating horizontal sync magnitude 124 of the horizontal sync pulse 20 of FIG. 8. The 4.7-biased horizontal sync magnitude 122 is delivered from the sample and hold circuit 96 to a first input 126 of a summer 128 via a conductor 130.

During this time, a positively and negatively varying audio signal 132 of FIG. 11 has been supplied from an audio input arrow 133, via a conductor 134, to an amplifier 136 having automatic gain control. The amplifier 136 delivers the varying audio signal 132 to a low pass filter 138 via a conductor 140, and the low pass filter 138 delivers the varying audio signal 132 to a second input 142 of the summer 128 via a conductor 144.

The low pass filter 138 is designed in accordance to the Nyquist criteria, and uses a three pole Chebychev circuit to limit the varying audio signal 132 to a 5 kilohertz bandwidth. This frequency range is sufficient to accommodate audio communication, but not high fidelity music. Preferably, the low pass filter 138 reduces the audio signal 132 by 3 dB at 5 kilohertz.

Therefore, the positively and negatively varying audio signal 132 of FIG. 11, as amplified and filtered by the amplifier 136 and the filter 138, is added to the 4.7-biased horizontal sync magnitude 122 of FIG. 10 in the summer 128, to provide a 4.7-biased audio signal 146, as shown in FIG. 12. That is, the 4.7-biased audio signal 146 is equal to the sum of the positively and negatively varying audio signal 132 of FIG. 11, the floating sync magnitude 124 of FIG. 8, and a bias of 4.7 volts.

Returning now to the 10 microsecond one-shot 108 and the 3 microsecond one-shot 114, when the 10 microsecond one-shot 108 receives a trigger pulse from the sync detector 92, it starts a 10 microsecond delay from the leading edge 22 of the horizontal sync pulse 20. At the end of the 10 microsecond delay, the one-shot 108 delivers a trigger signal to a primary input 148 of the 3 microsecond one-shot 114 via a conductor 149.

The 3 microsecond one-shot 114 provides a Q output to a Q conductor 140 for a period of 3 microseconds. At all other times the 3 microsecond one-shot 114 provides a NOT-Q output to a NOT-Q conductor 152.

An analog switch 154 includes a first control input 156 that is connected to the Q conductor 150, a second control input 158 that is connected to the NOT-Q conductor 152, an audio input 160, a video input 162, and an output 164.

The audio input 160 is connected to an output 166 of the summer 128 via a conductor 168; so that the 4.7-biased audio signal 146 of FIG. 12 is continuously supplied to the audio input 160 of the analog switch 154.

Not only is the 4.7-biased audio signal 146 of FIG. 12 continuously applied to the audio input 160 of the analog switch 154; but also the 4.0-biased video signal 84 of FIG. 9 is continuously supplied to the video input 162 of the analog switch 154.

At all times except during a 3 microsecond interval in which the Q output signal exists in the Q conductor 150, the analog switch 154 communicates the video input 162 to the output 164, thereby delivering the 4.0-biased video signal 84 of FIG. 9 to a buffer 170 via a conductor 172, and to an audio-on-video output 174 via a conductor 176.

However, for a period 178, as shown in FIG. 13, which starts 10 microseconds after the leading edge 22 of the horizontal sync pulse 20, and which continues for 3 microseconds, the Q output signal exists in the Q conductor 150, and the analog switch 154 blocks communication from the video input 162 to the output 164, thereby effectively removing a video part 180, as shown in FIG. 13, of the luminance portion 16 of the 4.0-biased video signal 84.

Also, during this 3 microsecond time period, the analog switch 154 communicates the audio input 160 of the analog switch 154 to the output 164, thereby delivering an audio part, or nonvideo part, 182, as shown in FIG. 14, from the audio input 160 of the analog switch 154 to the output 164 thereof. The audio part 182 also has the period 178, as shown in FIG. 14.

The result is an audio-on-video signal 184 at the output 164 of the analog switch 154. The audio-on-video signal 184, which includes the audio part 182, is shown in FIG. 15.

That is, the output 164 of the analog switch 154 delivers a signal to the buffer 170 via the conductor 172 that consists of the 4.0-biased video signal 84 of FIG. 9, minus the video part 180 of FIG. 13, plus the audio part 182 of FIG. 14, thereby providing the audio-on-video signal 184 of FIG. 15.

As shown in FIG. 16, the audio part 182 has an audio plus magnitude 186 that is the sum of the floating horizontal sync magnitude 124 of FIG. 8, a bias 188 of 4.7 volts, and an audio magnitude 190 of the audio signal 132. Or, as shown in FIG. 17, the audio plus magnitude 186 of the audio part 182 is equal to the sum of the floating horizontal sync magnitude 124 of FIG. 8, a bias 192 of 4.0 volts, a bias 194 of 0.7 volts, and the audio magnitude 190.

If it were not for this bias 914 of 0.7 volts, negative magnitudes of the audio signal 132 of FIG. 11 would push the audio plus magnitude 186 down into the range between a horizontal blanking magnitude 196 and a horizontal sync magnitude 198, both of FIG. 15.

If audio magnitudes 190 were to descend below the horizontal blanking magnitude 196, they could interfere with timing of the scan lines (not shown) as controlled by the leading edge 22 of the horizontal sync pulse 20.

As described above, the video part 180 that has been removed from the 4.0-biased video signal 84 of FIG. 13, and the audio part 182 of FIG. 14 that has been inserted into the 4.0-biased video signal 84 of FIG. 13 to make the audio-on-video signal 184 of FIG. 15 are both proximal to the back porch, 26 or 32.

Alternately, by increasing the time delay of the 10 microsecond one-shot 108, the Q conductor 150 is energized later, and a video part 200, as shown in FIG. 13, that is proximal to the front porch 24, is removed from the 4.0-biased video signal 84; and the removed video part 200 is replaced by an audio part, or nonvideo part, 202, as shown in FIG. 15.

Or, by energizing the Q conductor 150 10 microseconds after the leading edge 22 of the horizontal sync pulse 20, and also energizing the Q conductor 150 after a longer delay, both video parts, 180 and 200, will be removed from the 4.0-biased video signal 84, and both of the audio parts, 182 and 202, will be inserted into the 4.0-biased video signal 84 to form the audio-on-video signal 184 of FIG. 15. That is, as shown in FIG. 15, one audio part, or nonvideo part, 182 may be inserted into the luminance portion 16 proximal to the front porch 24, and another audio part, or nonvideo part, 182 may be inserted into the luminance portion 16 proximal to the back porch 26.

Referring to FIG. 7, the operation of the transmitter apparatus 70 continues as described until the vertical blanking portion, 13A or 13B, occurs. However, before considering operation of the present invention during the vertical blanking portions, 13A and 13B, it is important to consider additional facts about the operation of the video transmitter apparatus 70.

When a horizontal sync pulse 20 occurs, a signal of 5.07 microseconds duration is sent to the auxiliary input 112, thereby disabling the 3 microsecond one-shot 114 for 5.07 microseconds. However, the 10 microsecond one-shot 108 applies a trigger signal to the primary input 148 of the 3 microsecond one-shot 114 after 10 microseconds.

Therefore, the sync detector 92 and the 10 microsecond one-shot 108 cooperate with the horizontal sync pulse 20 to produce a 3 microsecond output from the 3 microsecond one-shot 114 that occurs between 10 and 13 microseconds after the leading edge 22 of the horizontal sync pulse 20.

However, when the vertical sync pulse 48 of FIG. 6 occurs, since the time duration of the serrations 50 of the vertical sync pulses 48 are 27.30 microseconds, one of the serrations 50 is still applying a disable signal to the auxiliary input 112, and is still disabling the 3 microsecond one-shot 114 after the 10 microsecond one-shot 108 has attempted to activate the 3 microsecond one-shot 114.

Therefore, during the vertical sync pulse 48, the 3 microsecond one-shot 114 continues to produce a NOT-Q output in the NOT-Q conductor 152; and the analog switch 154 delivers the 4.0-biased video signal 84 from the video input 162 to the output 164 of the analog switch 154 continuously during the entire vertical sync period 52 of the vertical sync pulse 48, including all serrations 50 thereof.

However, as noted previously, the leading and trailing equalizing pulses, 46 and 56, of FIG. 6 each has a time duration of only 2.543 microseconds; so the sync detector 92 delivers a trigger signal to the auxiliary input 112 of the 3 microsecond one-shot 114 for only 2.543 microseconds. Thus the 10 microsecond one-shot 108 delivers a trigger signal to the 3 microsecond one-shot 114 after termination of a disable signal from the auxiliary input 112 of the 3 microsecond one-shot 114.

Referring to FIGS. 6, 17 and 18, the result is that the 3 microsecond one-shot 114 is actuated between 10 and 13 microseconds after a leading edge 204 of the equalizing pulse, 46 or 56. Since two equalizing pulses, 46 or 56, and two blanking parts 206 that are interposed between pairs of equalizing pulses, 46 or 56, have a total time duration of 1.0 H, and since the equalizing pulses, 46 and 56, are 2.432 microseconds wide, each blanking part 206 is 29.2 microseconds in width.

Therefore, the 3 microsecond one-shot 114 is triggered 7.457 microseconds after a trailing edge 208 of each equalizing pulse, 46 or 56; and, as shown in FIG. 18, an audio part 212 that is 3 microseconds wide is inserted into the blanking part 206. The audio part 212 starts 7.457 microseconds after the trailing edge 208 of an equalizing pulse, 46 or 56, and ends 10.457 microseconds after the trailing edge 208.

Referring now to FIGS. 6 and 19, as previously noted, 10 to 21 test signals 58 are included into the video fields, 15A and 15B, subsequent to the trailing equalizing pulses 56, and each of the test signals 58 includes both a horizontal sync pulse 20 with a leading edge 22, and a blanking portion 60.

Since the horizontal sync pulses 20 of the test signals 58 each has a width of 5.07 microseconds, the apparatus of the present invention places audio parts 214, as shown in FIG. 19, into each of the test signals 58; and the audio parts 214 are located between 10 and 13 microseconds from the leading edge 22 of the horizontal sync pulse 20. The remainder of each of the blanking portions 60 is available for insertion of any test information that a broadcaster may wish to transmit.

As previously noted, the video transmitter apparatus 70 of FIG. 7 is interposed into a standard video transmitter (not shown) subsequent to the video information being placed into the luminance portion 16, but prior to modulation. The floating video signal 74 that enters at the video input arrow 72 is floating about zero volts; but the audio-on-video signal 184 that exits at the audio-on-video output 174 is biased.

At the audio-on-video output 174, the 4.0-biased video signal 84 of FIG. 13 is biased by 4.0 volts, and the audio parts, 182 and 202, of FIG. 15 are biased 4.7 volts above the horizontal sync magnitude 124 of FIG. 8. However, the audio-on-video output 174 is coupled back into the video transmitter (not shown) by a capacitor (not shown). Thus, by AC coupling the video transmitter apparatus 70 back into the video transmitter, the bias is removed, leaving an audio-on-video signal (not shown) that is the same as the audio-on-video signal 184 of FIG. 16, except that the 4.0 volt bias has been removed.

Figure 20:
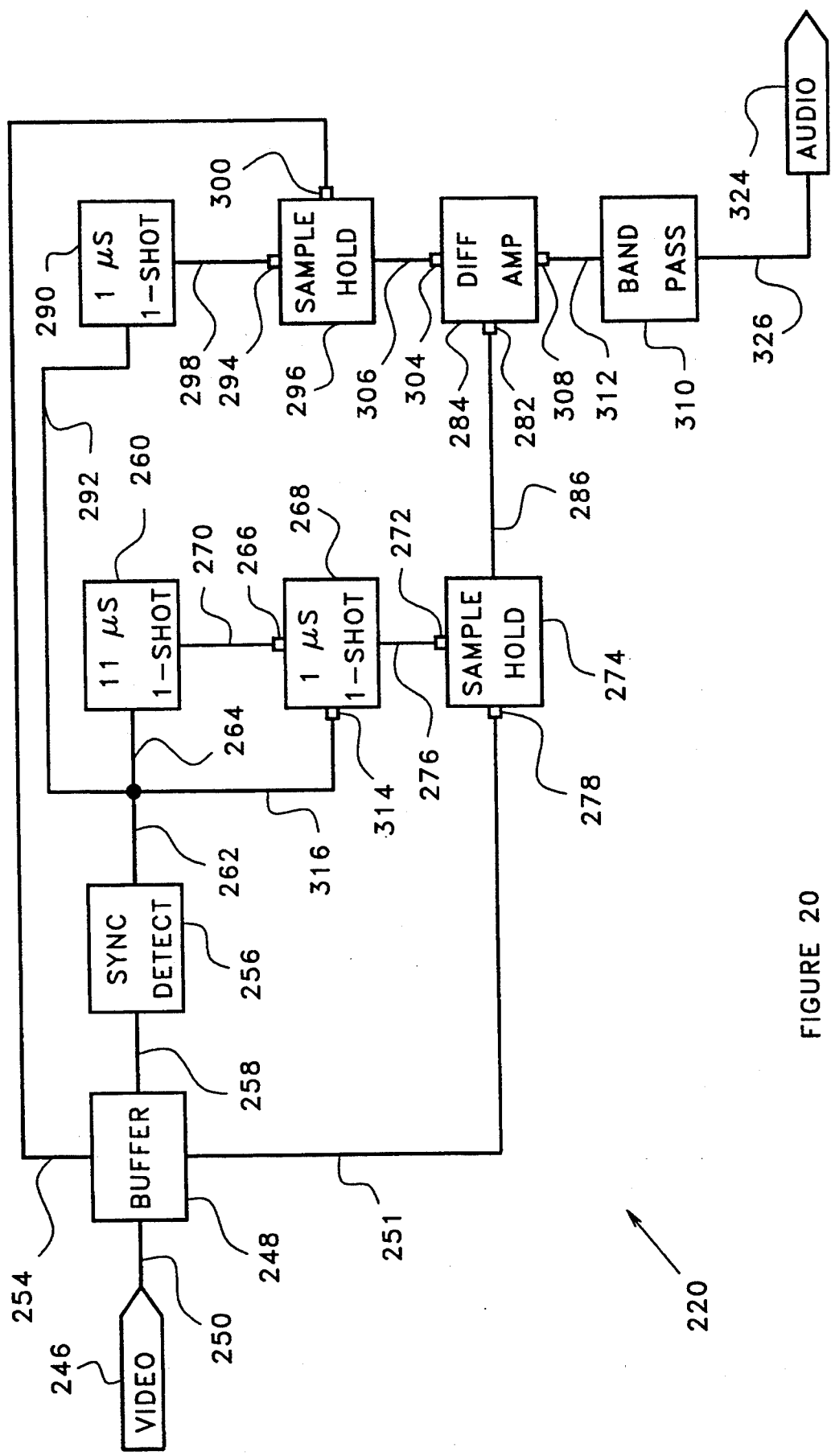
FIG. 20 is a block diagram of a video receiver apparatus of the present invention.
Figure 21A:
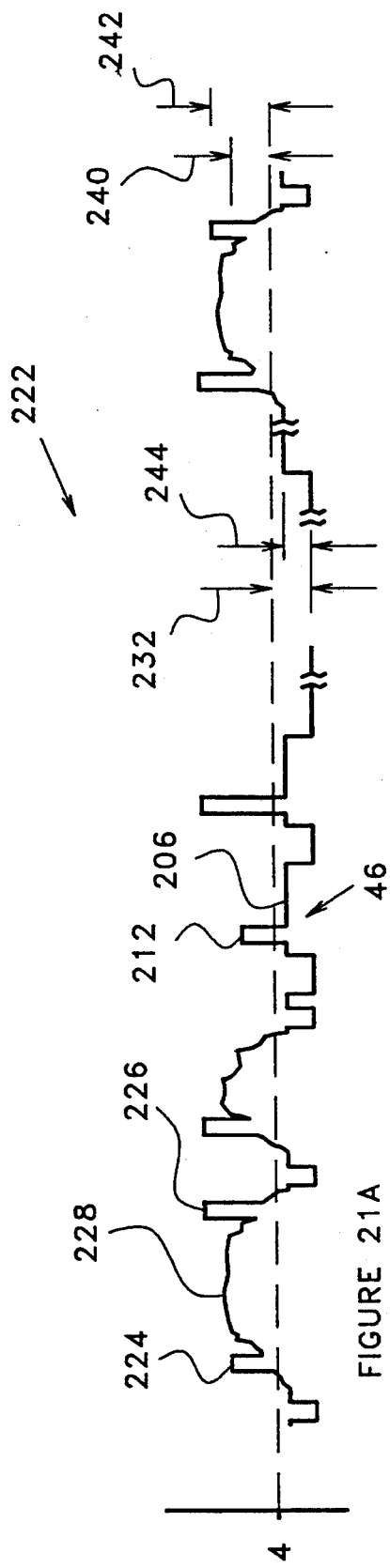
FIG. 21A is a curve showing audio parts interposed into the luminance portion of a horizontal composite signal near the front and back porches.

Referring now to FIG. 20, video receiver apparatus 220 is provided for use in a video receiver (not shown) for recovering audio from a demodulated audio-on-video signal 222 of FIG. 21A wherein one or more audio signals, such as audio parts, or nonvideo parts, 224 and/or 226, have been interposed into the horizontal composite signal 12 of FIG. 2.

The receiver apparatus 220 is interposed into a video receiver (not shown) that is standard, except that, since audio is not included on sidebands, no provisions are included for dealing with audio signals on sidebands. More particularly, the receiver apparatus 220 is patched into the video receiver (not shown) subsequent to demodulation.

As shown in FIG. 21A, the audio parts 224 and 226 are disposed in a luminance portion 228 of the audio-on-video signal 222. That is, preferably one or more of the audio parts, 224 or 226, are disposed, at least partially, within the luminance portion 228.

Referring now to FIG. 22, the audio part 224 includes an audio plus magnitude 230; and the audio plus magnitude 230 is the sum of a horizontal sync magnitude 232, a bias magnitude 234 of 0.7 volts that was added by the transmitter apparatus 70 of FIG. 7, and an audio magnitude 236. As shown in FIG. 21A, the audio-on-video signal 222 is biased 4.0 volts; and as shown in FIG. 22, the audio plus magnitude 230 is biased 4.0 volts.

The bias magnitude 234 of 0.7 volts, that was added to the audio signal 132 of FIG. 11 in the video transmitter apparatus 70 of FIG. 7, has placed a zero magnitude, or zero amplitude 238 of the audio plus magnitude 230 close, in magnitude, to a midpoint 240, as shown in FIG. 21A, of a maximum luminance magnitude 242.

Therefore, for both positive and negative values of audio magnitudes 236, placing the zero magnitude 238 at the midpoint 240 of the maximum luminance magnitude 242 allows a maximum variation in audio magnitude 236 without the audio plus magnitude 230 going above the maximum luminance magnitude 242 or below a horizontal blanking magnitude 244.

Referring again to FIG. 20 and the video receiver apparatus 220, the audio-on-video signal 222 of FIG. 21A is supplied to the receiver apparatus 220 at a video input arrow 246, and the audio-on-video signal 222 is applied to a buffer 248 via a conductor 250.

The buffer 248 buffers the audio-on-video signal 222 and supplies it to a conductor 251; and the buffer 248 supplies a 4.7-biased audio-on-video signal 252, as shown in FIG. 23, to a conductor 254. As its name implies, the 4.7-biased audio-on-video signal 252 is biased 0.7 volts above the audio-on-video signal 222 as supplied at the video input arrow 246, which is biased 4.0 volts.

The buffer 248 is connected to a sync detector 256 by a conductor 258, and the sync detector 256 detects the leading edge 22 of the sync pulse 20 of FIG. 3. When the sync detector 256 detects the leading edge 22 of the sync pulse 20, it sends a trigger pulse to an 11 microsecond one-shot 260 via conductors 262 and 264. At the end of 11 microseconds, the one-shot 260 sends a trigger signal to a primary input 266 of a 1 microsecond one-shot 268 via a conductor 270.

In response to the trigger signal from the 11 microsecond one-shot 260, the 1 microsecond one-shot 268 sends a sample enable signal to a signal enable input 272 of a sample and hold circuit 274 via a conductor 276. The sample and hold circuit 274 also receives the audio-on-video signal 222. That is, the audio-on-video signal 222 is continuously applied to an audio sample input 278 of the sample and hold circuit 274 by the conductor 251.

Figure 21B:
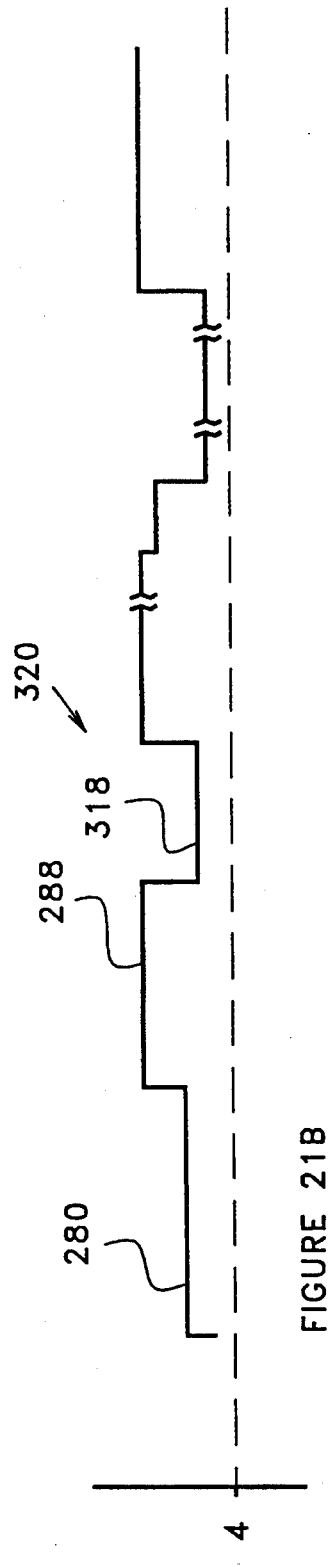
FIG. 21B is a curve showing the stepped audio output before filtering.

Therefore, in response to a sample enable signal from the 1 microsecond one-shot 268, the sample and hold circuit 274 samples the audio plus magnitude 230 of the audio part 224 of FIG. 22 for 1.0 microsecond to produce an audio sample magnitude 280, as shown in FIG. 21B, and holds the audio sample magnitude 280 until the next sample enable signal. That is, the sampling period occurs at a time that starts 11 microseconds after the leading edge 22 of the horizontal sync pulse 20, and that ends 12 microseconds after the leading edge 22.

Referring now to FIGS 20, 21A, and 21B, since the sample and hold circuit 274 takes the sample magnitude 280 between 11 and 12 microseconds after the leading edge 22 of the sync pulse 20, the sample magnitude 280 is taken exactly in the middle of the audio part 224 that started 11 microseconds after the leading edge 22 and ended 12 microseconds after the leading edge 22.

The sample magnitude 280 is delivered to an audio sample input 282 of a differential amplifier 284 by a conductor 286. As shown in FIG. 21B, the audio sample magnitude 280 is held constant until replaced by a new audio sample magnitude 288, which is taken between 11 and 12 microseconds after the next leading edge 22 of the next horizontal sync pulse 20.

The sync detector 256 also delivers a trigger pulse, that corresponds to the leading edge 22 of the horizontal sync pulse 20, to a 1 microsecond one-shot 290 via the conductor 262 and a conductor 292. And, the 1 microsecond one-shot 290 delivers a trigger pulse to a trigger input 294 of a sample and hold circuit 296 via a conductor 298. During this time, and also continuously, the 4.7-biased audio-on-video signal 252 of FIG. 23 is supplied to a biased input 300 of the sample and hold circuit 296 by the conductor 254.

When triggered by the 1 microsecond one-shot 290, the sample and hold circuit 296 samples a 4.7-biased horizontal sync magnitude 302, as shown in FIG. 23, of the 0.7-biased audio-on-video signal 252 which is continuously supplied to the biased input 300, holds the sync magnitude 302 until replaced by a new magnitude, and delivers the sync magnitude 302 to a biased input 304 of the differential amplifier 284 via a conductor 306.

The sample and hold circuit 296 takes samples of the 4.7-biased audio-on-video signal 252 at a time that is 1.0 microsecond after the leading edge 22 of the horizontal sync pulse 20. Thus, the sample is taken during the 5.07 microseconds of the horizontal sync pulse 20; and the sample is the 4.7-biased horizontal sync magnitude 302 of FIG. 23.

As shown above, the differential amplifier 284 is provided with two inputs, 282 and 304, both of which are held until some time with respect to the next leading edge 22 of the horizontal sync pulse 20. At the audio sample input 282, the audio sample magnitude 280 of the audio part 224 is held constant until replaced by the audio sample magnitude 288, 11 microseconds after the succeeding horizontal sync pulse 20.

The differential amplifier 284 delivers a voltage to an output 308 thereof that is equal to the audio plus magnitude 230 of FIG. 22, as applied to the audio sample input 282, minus the bias magnitude 234 of 0.7 volts of FIG. 22, as applied to the biased input 304 of the differential amplifier 284, all biased 4.0 volts as shown in FIG. 21A.

As can be seen in FIG. 22, the difference between the audio plus magnitude 230, such as the audio sample magnitudes, 280 and 288, of FIG. 21B, and the bias magnitude 234, is the audio magnitude 236. The audio magnitude 236 is delivered from the differential amplifier 284 to a band-pass filter 310 via a conductor 312.

Continuing to refer to FIG. 20, when a horizontal sync pulse 20 occurs, the 11 microsecond one-shot 260 actuates the 1 microsecond one-shot 268 at the end of 11 microseconds.

During the horizontal sync pulse 20, that is, until 5.07 microseconds after the leading edge 22, the sync detector 256 sends a trigger pulse to an auxiliary input 314 of the 1 microsecond one-shot 268 via a conductor 316; and this trigger pulse at the auxiliary input 314 prevents the 1 microsecond one-shot 268 from being actuated by the 11 microsecond one-shot 260 at the primary input 266.

However, since the 11 microsecond one-shot 260 triggers the 1 microsecond one-shot 268 after 5.07 microseconds, the 1 microsecond one-shot 268 is triggered by the 11 microsecond one-shot 260. Therefore, a new audio sample magnitude, 280 or 288, of FIG. 21B is taken from each audio-on-video signal 222 of FIG. 21A.

Referring now to FIGS. 6, 20, and 21A, in like manner, since the time duration of the equalizing pulses 46 and 56 is 2.543 microseconds, the 11 microsecond one-shot 260 energizes the 1 microsecond one-shot 268 after cessation of the equalizing pulse, 46 or 56, thereby enabling the sample and hold circuit 274 to take a new audio sample magnitude 318 of the audio part 212 of FIGS. 18 and 21A. This new sample magnitude 318 is disposed in the blanking parts 206 that follow the leading equalizing pulses 46. In like manner, audio samples (not shown) will be placed into blanking parts 206 that follow the trailing equalizing pulses 56.

In contrast, the time duration of each serration 50 of the vertical sync pulse 48 is 0.43 H, or 27.30 microseconds. Therefore, since the time duration of each serration 50 is greater than 11 microseconds, a new audio sample magnitude, such as the sample magnitudes 280, 288, and 318, is not taken; but instead, a previously-taken audio sample magnitude, 318, is held.

That is, each audio sample magnitude, 280, 288, or 318, is replaced by a new sample magnitude, 280 or 318, and is replaced 11 microseconds after the leading edge 22 of a horizontal sync pulse 20 during times when horizontal composite signals 12 are producing video. Also, an audio sample magnitude, 318, is held from the blanking part 206 of one equalizing pulse, 46 or 56, until the blanking part 206 of the next equalizing pulse, 46 or 56; but it is only 0.5 H between equalizing pulses, 46 or 56.

However, an audio sample magnitude, 280 or 288, is held from the last blanking part 206 of a leading equalizing pulses 46, during the 3.0 H of the vertical sync pulse 48, and until the first blanking part 206 following the first trailing equalizing pulse 56. Thus, an audio sample magnitude 318 is held for a time period of approximately 4.0 H, or 254 microseconds.

Therefore, an audio sample magnitude 318 is held approximately four times longer during the vertical blanking portions, 13A and 13B, than an audio sample magnitude, 280 or 288, is held during a single scan line of a horizontal composite signal 12.

High-pass filtering, as provided in the band-pass filter 310, prevents a "clicking" noise that would occur as an audio sample magnitude 318 is held during a vertical sync pulse 48. That is, high-pass filtering filters out noise that would be caused by holding a given audio sample magnitude 318 for a time period of approximately 3.5 H. Preferably, the band-pass filter 310 reduces frequencies of 250 Hertz by 3 dB.

Figure 21C:
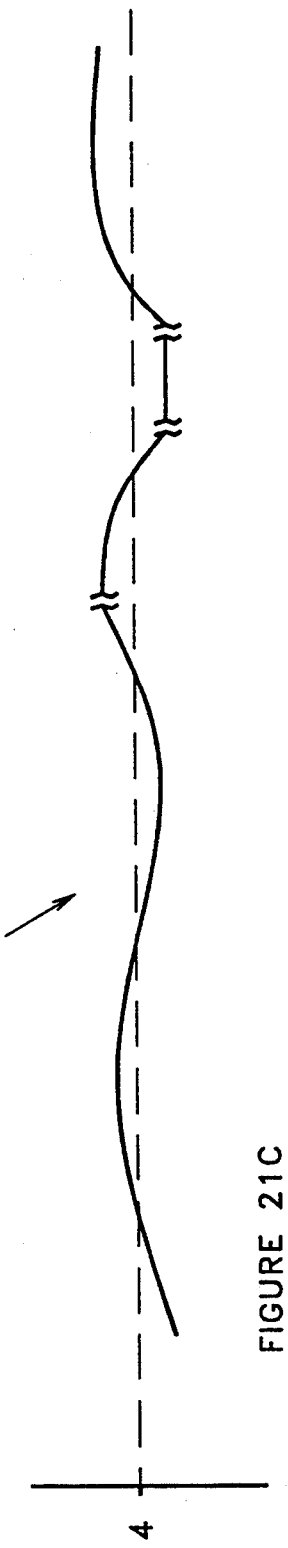
FIG. 21C is a curve showing the stepped audio output after filtering.

The band-pass filter 310 also provides low-pass filtering. Low-pass filtering, as provided by the band-pass filter 310, prevents errors that could occur due to Nyquist criteria, smooths a stepped audio output 320 of FIG. 21B into a smoothed audio output 322 of FIG. 21C, and also removes noise spikes (not shown) from the stepped audio output 320. Preferably, the low-pass filtering reduces a 5 kilohertz signal by 3 dB. The smoothed audio output 322 is delivered from the band-pass filter 310 to an audio output arrow 324 via a conductor 326.

The smoothed audio output 32 allows audio frequencies in the range of 250 Hertz to 5 kilohertz, which is entirely adequate for verbal communications; and, even though the smoothed audio output 322 has been obtained from the stepped audio output 320, any difference between the smoothed audio output 322 and audio which has not been obtained from stepped audio, such as the stepped audio output 320, is not recognizable to the ear.

The present invention allows color video to be broadcast together with audio in a 10 megahertz bandwidth, as compared to a bandwidth that can exceed 25 megahertz for conventional color video transmitters. A part of this reduction in bandwidth is achieved by placing the audio on the video signal. Further reduction in the required bandwidth is achieved by reducing the percentage of modulation.

As is well known, the required bandwidth is approximately equal to Carson's Rule. Carson's Rule states that the required bandwidth is equal to twice the sum of the maximum modulation frequency and the maximum frequency deviation.

By placing audio on the horizontal composite signal 12, and thereby eliminating audio sidebands, the required bandwidth for color FM video in the 1900 megahertz band is reduced from 26 megahertz to 16.2 megahertz. That is, with a modulation frequency of 4.1 megahertz and with a 4.0 megahertz deviation, the required bandwidth by Carson's Rule is $2 \times (4.1 + 4.0) = 16.2$ megahertz.

However, in the present invention, the deviation frequency is reduced from 4 megahertz to 900 kilohertz. With this reduction in deviation, the required bandwidth for color FM video in the 1900 megahertz band, as calculated by Carson's Rule, is $2 \times (4.1 + 0.9) = 10$ megahertz.

Further, the present invention allows black and white video to be broadcast together with audio in a 5 megahertz bandwidth, as compared to a bandwidth of 15–18 megahertz for conventional black and white video transmitters. A part of this reduction in bandwidth is achieved by placing the audio on the video signal. Further reduction in the required bandwidth is achieved by reducing the percentage of modulation.

For convention transmission of black and white video, the maximum modulation frequency is 1.5 megahertz; and the maximum frequency deviation for black and white video, as well as for color video, is 4.0 megahertz.

The bandwidth for black and white video, when transmitted in accordance with the principles of the present invention is reduced to $2 \times (1.5 + 4.0) = 11.0$ megahertz. Further, by reducing the maximum frequency deviation to 1.0 megahertz, the bandwidth requirement is reduced to $2 \times (1.5 + 1.0) = 5.0$ megahertz.

Therefore, the present invention permits color video to be broadcast in a 10.0 megahertz bandwidth, permits black and white video to be broadcast in a 5.0 megahertz bandwidth, and opens up tremendous possibilities for business to utilize the benefits of video communications.

Finally, in addition to reducing the required bandwidth, the present invention provides a video transmitter and a video receiver, both of which are of optimized simplicity. Both use circuitry of optimized simplicity and both use simple and low cost components. Therefore, in addition to providing video equipment for use in narrow bandwidth, the video transmitting and receiving equipment of the present invention achieve optimized economy of design and manufacturing.

The method of the video transmitter apparatus 70 of FIG. 7 includes inserting the audio part, 182 or 202, of the audio signal 132 into the composite video signal 10 having the front porch 24, the horizontal sync pulse 20, the back porch 26, and the luminance portion 16. The steps of the method include sampling the audio part, 182 or 202, of the audio signal 132, removing the video part, 180 or 200, from the luminance portion 16 of the composite video signal 10, and replacing the video part, 180 or 200, with the audio part, 182 or 202.

Additional steps of the method of the video transmitter apparatus 70, and the method of the video receiver apparatus 220 of FIG. 20 can be understood by referring to the respective detailed descriptions.

While specific apparatus and method have been disclosed in the preceding description, and while part numbers have been inserted parenthetically into the claims to facilitate understanding of the claims, it should be understood that these specifics have been given for the purpose of disclosing the principles of the present invention and that many variations thereof will become apparent to those who are versed in the art. Therefore, the scope of the present invention is to be determined by the appended claims, and without any limitation by the part numbers inserted parenthetically in the claims.

INDUSTRIAL APPLICABILITY

The present invention is applicable for use with video transmitters and video receivers, whether the video is amplitude or frequency modulated; and the present invention is particularly applicable to applications wherein it is desirable, or necessary, to minimize the combined bandwidth requirement of video and audio signals.

What is claimed is:

1. A method for inserting an audio signal into a composite video signal having a front porch, a horizontal sync pulse, a back porch, and a luminance portion, which method comprises:
   a) sampling a magnitude of said horizontal sync pulse;
   b) sampling a magnitude of said audio signal;
   c) holding one of said sampled magnitudes;
   d) performing said sampling of the other of said magnitudes during said holding step;
   e) combining said sampled audio signal magnitude, said sampled horizontal sync magnitude, and a bias magnitude to provide an audio plus magnitude;
   f) performing a part of said combining step during said holding step; and
   g) replacing a first part of said composite video signal with said audio plus magnitude.

2. A method as claimed in claim 1 in which said sampling and combining steps comprise sampling and combining voltages.

3. A method as claimed in claim 1 in which said combining step comprises:
   a) sampling said horizontal sync magnitude and said bias magnitude; and
   b) adding said sum of said horizontal sync magnitude and said bias magnitude to said audio signal magnitude.

4. A method as claimed in claim 1 in which said combining step comprises:
   a) sensing an occurrence of said horizontal sync pulse;
   b) starting said first part of said composite video signal at a predetermined time subsequent to said sensing step; and
   c) determining a time duration of said first part of said composite video signal at a time related to said sensing step.

5. A method as claimed in claim 1 in which said replacing of said first part with said audio plus magnitude comprises starting said first part of said composite video signal at a time greater than 9.0 microseconds from a leading edge of said horizontal sync pulse, and ahead of the succeeding front porch.

6. A method as claimed in claim 1 in which said replacing of said first part of said composite video signal with said audio plus magnitude comprises partially disposing said first part between said back porch and the succeeding front porch.

7. A method as claimed in claim 1 in which said replacing of said first part of said composite video signal with said audio plus magnitude comprises partially disposing said first part in said luminance portion.

8. A method as claimed in claim 1 in which said replacing of said first part of said composite video signal with said audio plus magnitude comprises:
   a) partially disposing said first part in said luminance portion; and
   b) disposing said first part closer to said back porch than to the succeeding front porch.

9. A method as claimed in claim 1 in which said method further comprises:
   a) replacing a second part of said composite video signal with a second audio plus magnitude; and
   b) disposing one of said audio plus magnitudes partially within said luminance portion.

10. A method as claimed in claim 1 in which said method further comprises:
    a) replacing a second part of said composite video signal with a second audio plus magnitude;
    b) disposing both of said audio plus magnitudes partially within said luminance portion; and
    c) positioning one of said audio plus magnitudes proximal to said back porch and the other of said audio plus magnitudes proximal to the succeeding front porch.

11. A method as claimed in claim 1 in which said method further comprises:
    a) replacing a second part of said composite video signal with a second audio plus magnitude; and
    b) spacing said audio plus magnitudes more than 2.0 microseconds apart.

12. A method as claimed in claim 1 in which said method further comprises sampling said magnitude of said audio signal during a blanking portion of a test signal.

13. A method as claimed in claim 1 in which said method further comprises sampling said magnitude of said audio signal during a blanking part following an equalization pulse.

14. A method for inserting an audio signal into a composite video signal having a front porch, a horizontal sync pulse, a back porch, and a luminance portion, which method comprises:
    a) sampling a magnitude of said horizontal sync pulse;
    b) sampling a magnitude of said audio signal;
    c) performing said sampling of said horizontal sync magnitude prior to said sampling of said audio signal magnitude;
    d) summing said horizontal sync magnitude with a bias magnitude;
    e) holding said summed magnitude;
    f) performing said sampling of said audio signal magnitude during said holding step;
    g) combining said sampled audio signal magnitude, said sampled horizontal sync magnitude, and said bias magnitude to provide an audio plus magnitude;
    h) completing said combining step during said holding step; and
    i) replacing a part of said composite video signal with said audio plus magnitude.

15. A method as claimed in claim 14 in which:

a) said sampling and combining steps comprise sampling and combining voltages; and b) said replacing of said part of said composite video signal with said audio plus magnitude comprises starting said part of said composite video signal at a time greater than 9.0 microseconds from a leading edge of said horizontal sync pulse and ahead of the succeeding front porch, and extending said part of said composite video signal for a predetermined time.

16. A method as claimed in claim 14 in which said replacing of said part of said composite video signal with said audio plus magnitude comprises:

a) partially disposing said part in said luminance portion; and b) disposing said part closer to the succeeding front porch than to said back porch.

17. A method as claimed in claim 14 in which said method further comprises:

a) sampling a magnitude of said audio signal during a blanking part following a leading equalization pulse;

b) sampling another magnitude of said audio signal during a blanking part of a trailing equalizing pulse; and c) sampling still another magnitude of said audio signal during a blanking portion of a test signal.

18. A method as claimed in claim 14 in which said method further comprises sampling said magnitude of said audio signal during a blanking portion of a test signal.

19. A method for separating an audio signal from a demodulated composite video signal having a horizontal sync pulse, a back porch, a luminance portion, a front porch, and a vertical blanking portion with a vertical sync pulse, which method comprises:

a) separately floating said demodulated composite video signal around higher and lower magnitudes;

b) sampling a horizontal sync pulse magnitude from said higher floated signal;

c) sampling the magnitude of a first part of said composite video signal that lies partially within said luminance portion from said lower floated signal;

d) holding said sampled magnitude of said first part;

e) replacing said held sampled magnitude with successively sampled magnitudes;

f) biasing said successively sampled magnitudes; and g) said biasing step comprises reducing one of said sampled magnitudes of said lower floated signal by said sampled magnitude of said higher floated signal.

20. A method as claimed in claim 19 in which said holding step comprises holding said sampled magnitude of said first part during a vertical sync pulse.

21. A method as claimed in claim 19 in which said holding step comprises holding said sampled magnitude of said first part during a vertical sync pulse, and said method further comprises high-pass filtering for filtering noise caused by holding said sampled magnitude of said first part during said vertical sync pulse.

22. A method as claimed in claim 19 in which said holding step comprises holding said sampled magnitude of said first part during a vertical sync pulse, and said method further comprises:

a) high-pass filtering for filtering noise caused by holding said sampled magnitude of said first part during said vertical sync pulse; and b) low-pass filtering in accordance with the horizontal scan frequency and Nyquist criteria.

23. A method as claimed in claim 19 in which said sampling partially within said luminance portion comprises sampling more than one-half within said luminance portion.

24. A method as claimed in claim 19 in which said sampling step comprises sampling the magnitude of a part of said luminance portion that is at least 1.0 microseconds in duration.

25. A method as claimed in claim 19 in which said method further comprises sampling a magnitude of a second part of said composite video signal that is disposed at least partially in said luminance portion, and that is spaced apart from the said first part by at least 2.0 microseconds.

26. A method as claimed in claim 19 in which said method further comprises:

a) sampling a magnitude of a second part of said composite video signal that is disposed at least partially in said luminance portion; and b) said sampling of said sampled magnitudes comprises sampling said parts of said composite video signal closer to separate ones of said porches than to each other.

27. A method for separating an audio signal from a composite video signal having a horizontal sync pulse, a back porch, a luminance portion, a front porch, and a vertical sync pulse, which method comprises:

a) sampling the voltage of said horizontal sync pulse;

b) holding said sampled horizontal sync voltage;

c) sampling the voltage of a first part of said composite video signal into which a first audio plus voltage has been inserted;

d) said sampling of said first part comprises sampling said first audio plus voltage during said holding step;

e) reducing said sampled first part to a sampled audio voltage by subtracting the sum of said sampled horizontal sync voltage and a bias voltage; and f) said reducing step comprises summing said sampled horizontal sync voltage and said bias voltage, holding said summed voltage, and subtracting said summed voltage from said sampled first audio plus voltage during both of said holding steps.

28. A method as claimed in claim 27 in which said sampling of said first audio plus voltage comprises sampling said first audio plus voltage partially within said luminance portion.

29. A method as claimed in claim 27 in which:

a) said method further comprises sampling the voltage of a second part of said composite video signal into which a second audio plus voltage has been inserted; and b) said sampling steps comprise sampling parts spaced more than 2.0 microseconds apart.

30. A method for separating an audio signal from a composite video signal having a horizontal sync pulse, a back porch, a luminance portion, a front porch, and a vertical sync pulse, which method comprises:

a) sampling the voltage of said horizontal sync pulse;

b) sampling the voltage of a first part of said composite video signal into which a first audio plus voltage has been inserted;

c) holding one of said sampled voltages;

d) performing the other said sampling step during said holding step;

e) holding the other of said sampled voltages;

f) reducing said sampled voltage of said first part to a first sampled audio voltage by subtracting the sum of said sampled horizontal sync voltage and a bias voltage; and g) performing a part of said reducing step during both of said holding steps.

31. A method as claimed in claim 30 in which said method further comprises:

a) producing said first sampled audio voltage during both of said holding steps;

b) holding said first sampled audio voltage during a vertical sync pulse;

c) replacing said first sampled audio voltage with another sampled audio voltage after said vertical sync pulse;

d) low-pass filtering successively replaced sampled audio voltages in accordance with Nyquist criteria; and e) high-pass filtering said successively replaced sampled audio voltages to reduce noise caused by holding one of said sampled audio voltages during said vertical sync pulse.

32. A method as claimed in claim 30 in which:

a) said method further comprises sampling the voltage of a second part of said composite video signal into which a second audio plus voltage has been inserted; and b) said sampling steps comprise sampling parts spaced farther from each other than from separate ones of said porches.

33. A method as claimed in claim 30 in which said method further comprises:

a) sampling a voltage of a second part of an equalization pulse into which a second audio plus voltage has been inserted; and b) reducing said second audio plus voltage to a second sampled audio voltage.

34. A method as claimed in claim 27 in which said method further comprises:

a) sampling a voltage of a portion of a test signal into which a second audio plus voltage has been inserted; and b) reducing said second audio plus voltage to a second sampled audio voltage.

35. A method as claimed in claim 30 in which said method further comprises:

a) producing said first sampled audio voltage during both of said holding steps;

b) holding said first sampled audio voltage; and c) replacing said first sampled audio voltage with successively new sampled audio voltages.

36. A method for separating an audio signal from a composite video signal having a horizontal sync pulse, a back porch, a luminance portion, a front porch, and a vertical sync pulse, which method comprises:

a) sampling the voltage of said horizontal sync pulse;

b) sampling the voltage of a first part of said composite video signal into which a first audio plus voltage has been inserted;

c) reducing said sampled voltage of said first part to a first sampled audio voltage by subtracting the sum of said sampled horizontal sync voltage and a bias voltage;

d) sampling a voltage of a part of a leading equalization pulse into which a second audio plus voltage has been inserted;

e) sampling a voltage of a part of a trailing equalization pulse into which a third audio plus voltage has been inserted;

f) sampling a voltage of a portion of a test signal into which a fourth audio plus voltage has been inserted; and g) reducing said second, third, and fourth audio plus voltages to second, third, and fourth sampled audio voltages.

37. A method for separating an audio signal from a demodulated composite video signal having a horizontal sync pulse, a back porch, a luminance portion, a front porch, and a vertical blanking portion with a vertical sync pulse, which method comprises:

a) separately floating said demodulated composite video signal around higher and lower voltages;

b) sampling the magnitude of a part of said composite video signal that lies partially within said luminance portion at one of said floating voltages;

c) holding said sampled magnitude;

d) replacing said held sampled magnitude with successively sampled magnitudes;

e) biasing said sampled magnitudes; and f) said biasing step comprises sampling said composite video signal at the other of said floating voltages.

38. A method for inserting an audio signal into a composite video signal having a front porch, a horizontal sync pulse, a back porch, and a luminance portion, which method comprises:

a) floating said composite video signal at a different voltage in each of two separate paths;

b) sampling said composite video signal in one of said separately-floated paths;

c) using said sample to bias said audio signal; and d) using said biased audio signal to replace a portion of said video signal in the other of said separately-floated paths.

39. A method as claimed in claim 38 in which said method further comprises holding said sample of said composite video signal during one of said using steps.

40. A method as claimed in claim 38 in which said sampling step comprises sampling a magnitude of said horizontal sync pulse.

41. A method as claimed in claim 38 in which:

a) said sampling step comprises sampling a magnitude of said horizontal sync pulse; and b) said method further comprises holding said sampled magnitude of said horizontal sync pulse during one of said using steps.

42. A method as claimed in claim 38 in which the second using step comprises:

a) selecting a portion of said biased audio signal;

b) removing a portion of said composite video signal from said other separately-floated path; and c) replacing said removed portion of said composite video signal with said selected portion of said biased audio signal.

43. A method as claimed in claim 42 in which said method further comprises holding said sample of said composite video signal during one of said using steps.

44. A method as claimed in claim 42 in which said sampling step comprises sampling a magnitude of said horizontal sync pulse.

45. A method as claimed in claim 42 in which:

a) said sampling step comprises sampling a magnitude of said horizontal sync pulse; and b) said method further comprises holding said sampled magnitude of said horizontal sync pulse during one of said using steps.

* * * * *

UNITED STATES PATENT AND TRADEMARK OFFICE
CERTIFICATE OF CORRECTION

PATENT NO. : 5,426,466
DATED : 20 June 1995
INVENTOR(S) : Bocox et al.

It is certified that error appears in the above-indentified patent and that said Letters Patent is hereby corrected as shown below:

In column 8, "63,492" should be --63.492-- in line 27. In column 11, "140" should be --150-- in line 54. In column 12, "914" should be --194-- in line 45. In column 14, "16" should be --15-- in line 40. In column 16, "0.7" should be --4.7-- in line 14. In column 17, "32" should be --322-- in line 56.

Column 19, claim 3, "sampling" should be --summing--.
Column 23, claim 34, line 39, "27" should be --30--.

Signed and Sealed this

Twenty-sixth Day of December, 1995

Attest:

BRUCE LEHMAN

Attesting Officer

Commissioner of Patents and Trademarks